(No Model.)
R. SCHULDER & E. H. RUSSELL.
Ore Leacher.
No. 234,073.     Patented Nov. 2, 1880.
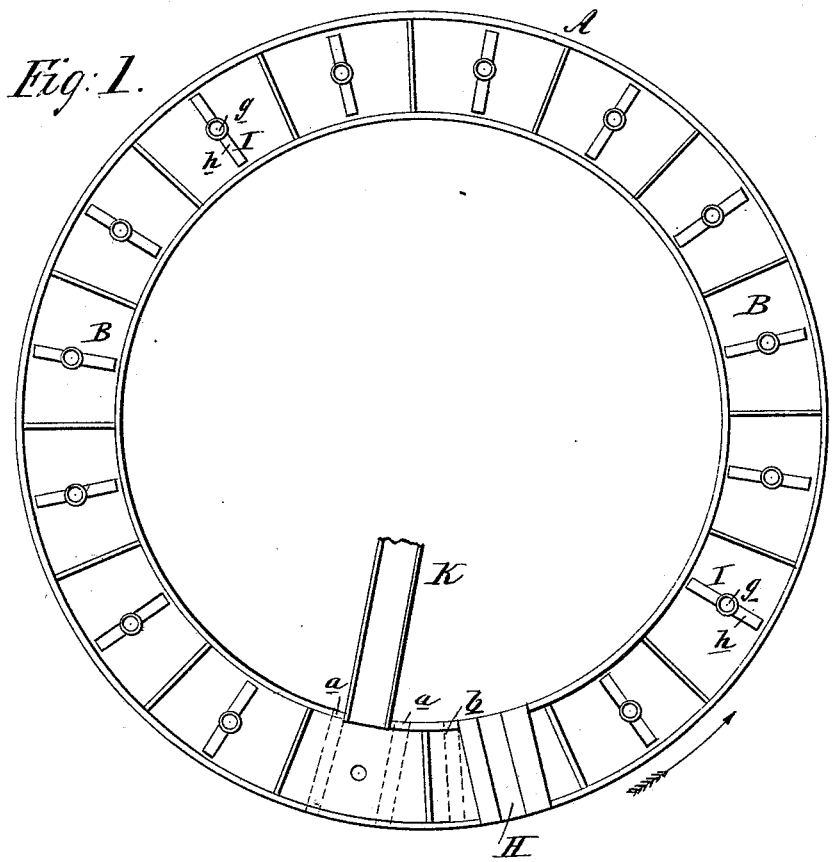
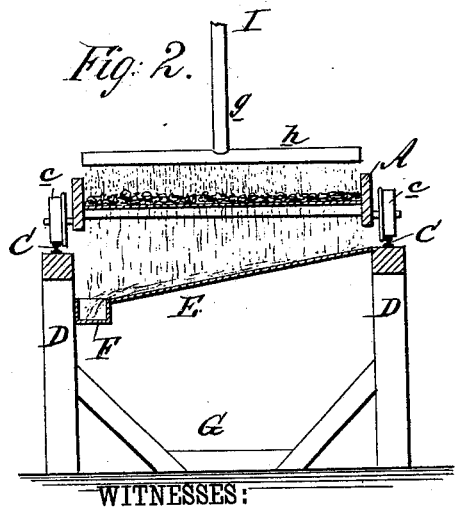
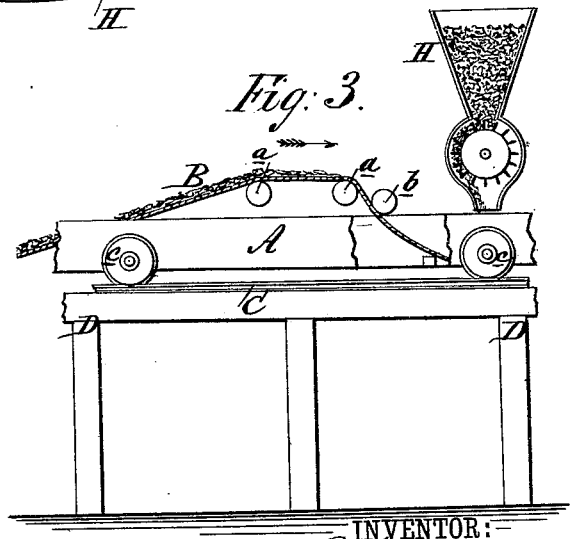
WITNESSES:
A. Schehl.
C. Sedgwick
INVENTOR:
R. Schulder
E. H. Russell
BY Munn & Co
ATTORNEYS.

UNITED STATES PATENT OFFICE.

RUDOLPH SCHULDER AND EDWARD H. RUSSELL, OF WEST JORDAN, UTAH TERRITORY.

ORE-LEACHER.

SPECIFICATION forming part of Letters Patent No. 234,073, dated November 2, 1880.

Application filed May 1, 1880. (No model.)

*To all whom it may concern:*

Be it known that we, RUDOLPH SCHULDER and EDWARD H. RUSSELL, of West Jordan, in the county of Salt Lake and Territory of Utah, have invented a new and Improved Leacher for Ores and other Substances, of which the following is a specification.

The object of this invention is to provide a simple and automatic apparatus for leaching ores and other substances on a large scale.

The invention consists of a circular frame supporting the filter and moving on a circular track above an inclined circular table; and it consists, further, of three stationary rollers designed to elevate and depress the filter at certain points as it revolves, of a device for feeding the substance to be leached upon the filter, of a device for applying the leaching solvent, and of a precipitating-tank to contain the solution passing through the filter.

Figure 1 is a plan of the circular revolving frame or filter. Fig. 2 is a transverse sectional elevation of the revolving frame, filter, circular table, and device for applying the leaching solvent. Fig. 3 is an elevation, partly in section, showing the revolving frame, circular track and table, filter, adjusting-rollers, and feed apparatus.

Similar letters of reference indicate corresponding parts.

In the drawings, A represents the circular frame, carrying between its sides a filter, B, of canvas, matting, or other suitable material. Extending transversely under the filter B from the point at which the ore or other substance is discharged are the two stationary rollers $a$ $a$, which serve to raise the filter at that point. Just beyond these rollers $a$ $a$, as the frame A and filter B move in the direction of the arrow, is a third stationary roller, $b$, set lower than the rollers $a$ $a$, so that the filter B shall pass under it. This frame A is set on wheels or rollers $c$, that rest on a track, C, which track C is supported on a frame-work, D, of the device. Beneath the filter B is a circular inclined table, E, around the inner and lower edge of which is a trough, F, below which trough F is the precipitating-tank G.

H is the feeding device to feed the ore or other material upon the filter B. I is the device for supplying the leaching solvent, which device consists of a rubber tube, $g$, connected at right angles with a tube, $h$, that is filled with perforations on its under side, so that the leaching solvent in passing through said tubes shall be sprinkled in a finely-comminuted condition upon the ore or other substance on the filter B.

K represents a conductor for directing water upon the filter at the point immediately over the rollers $a$ $a$, in order to wash off the leached ore or other substance.

In operating this device the comminuted ore or other substance is delivered by the feed apparatus H upon the filter B directly in front of the roller $b$, so that as the filter B revolves the said ore or other substance shall, from this point until it reaches the rollers $a$ $a$, be exposed to the action of the leaching solvent, which is discharged upon it through the pipes or tubes $g$ $h$, the leaching solvent at the same time dissolving the precious metal or other substances contained in the ore, and, filtering through the filter B, falls upon the inclined table E, thence into the trough F, which conducts it into the precipitating-tank G for treatment. As the said frame A and filter B continue to revolve, the filter B passes over the rollers $a$ $a$, at which point the ore or other substance upon the filter is found to be deprived of its soluble metal or other substance, and at this point, above the rollers $a$ $a$, water is discharged through the pipe K upon the said filter B to wash off the exhausted ore or other substance. The filter B then passes down beneath the roller $b$, as before stated, and receives a fresh supply of material from the feed apparatus H to be operated upon.

It is found in practice that a filter four feet wide, and the circle of which has a diameter of forty feet, will leach fifty tons of ore in twenty-four hours, and the apparatus can be applied wherever leaching-tanks are now used.

Having thus described our invention, we claim as new and desire to secure by Letters Patent—

1. The apparatus for leaching ores constructed substantially as herein shown and described, consisting of the feed apparatus H, circular frame A, mounted on wheels, filter B, rollers $a$ $a\ b$, pipe K, track C, inclined table E, and trough F, as set forth.

2. In an apparatus for leaching ores, the combination, with the circular frame A and filter B, of the sprinkler I, for applying the leaching solvent to the substance under treatment, substantially as herein shown and described.

3. In an apparatus for leaching ores, the combination, with the circular frame A and filter B, of the rollers $a\ a\ b$, sprinkler I, for applying the leaching solvent, feed apparatus H, and water-conductor K, substantially as herein shown and described.

4. In an apparatus for leaching ores, the combination, with the filter B, of the elevating-rollers $a\ a$ and the depressing-roller $b$, substantially as and for the purpose described.

5. In an apparatus for leaching ores, the combination, with the circular frame A and filter B, of the inclined circular table E and trough F, substantially as herein shown and described.

RUDOLPH SCHULDER.
EDWARD HUBBARD RUSSELL.

Witnesses:
JOHN S. HARRIS,
FRED. SCHENK.